United States Patent [19]
Cox et al.

[11] Patent Number: 6,125,418
[45] Date of Patent: Sep. 26, 2000

[54] METHOD AND APPARATUS FOR ENABLING A COMPUTER USER TO CONVERT A COMPUTER SYSTEM TO AN INTELLIGENT I/O SYSTEM

[75] Inventors: B. Tod Cox, Houston; Alan Lee Goodrum, Tomball, both of Tex.

[73] Assignee: Compaq Computer Corporation, Houston, Tex.

[21] Appl. No.: 08/757,429

[22] Filed: Nov. 27, 1996

[51] Int. Cl.[7] ................................................. C06F 13/00
[52] U.S. Cl. ........................... 710/104; 710/102; 710/49; 713/1; 713/100
[58] Field of Search ................................... 395/282–284, 395/651–653, 869, 870; 710/102–104; 713/1–100

[56] References Cited

U.S. PATENT DOCUMENTS

| | | | |
|---|---|---|---|
| 4,498,134 | 2/1985 | Hansen et al. | 712/13 |
| 4,967,342 | 10/1990 | Lent et al. | 395/241 |
| 5,297,272 | 3/1994 | Lu et al. | 710/129 |
| 5,473,499 | 12/1995 | Weir | 895/283 |
| 5,517,646 | 5/1996 | Piccirillo et al. | 713/1 |
| 5,542,055 | 7/1996 | Amini et al. | 710/101 |
| 5,559,965 | 9/1996 | Oztaskin et al. | 395/284 |
| 5,560,019 | 9/1996 | Narad | 710/260 |
| 5,572,688 | 11/1996 | Sytwu | 395/309 |
| 5,611,057 | 3/1997 | Pecone et al. | 395/282 |
| 5,636,347 | 6/1997 | Muchnick et al. | 395/283 |
| 5,664,231 | 9/1997 | Postman et al. | 395/893 |
| 5,687,379 | 11/1997 | Smith et al. | 710/200 |
| 5,692,219 | 11/1997 | Chan et al. | 395/869 |
| 5,713,006 | 1/1998 | Shigeeda | 395/653 |
| 5,751,975 | 5/1998 | Gillespie et al. | 710/126 |
| 5,913,045 | 6/1999 | Gillespie et al. | 710/129 |

FOREIGN PATENT DOCUMENTS 0629956 5/1994 European Pat. Off. .
0631241 5/1994 European Pat. Off. .

OTHER PUBLICATIONS

PCI Local Bus Specification Rev 2.1 Jun. 1, 1995 p. 14R Sects 3.7.4&5.2.1.

*Primary Examiner*—Paul R. Myers
*Attorney, Agent, or Firm*—Sharp, Comfort & Merrett, P.C.

[57] ABSTRACT

A method and apparatus for enabling a computer user to implement intelligent input/output processing involves a connector adapted to receive interrupt request signals from input/output devices in a plurality of slots contained on an input/output bus. When an intelligent input/output card is inserted into the connector, the card can process certain of the interrupt requests from devices contained in slots connected to the input/output bus. This augments the processing of input/output device interrupt requests without burdening the host processor. Thus, a computer system arranged in a peer architecture may be subsequently enhanced with a intelligent input/output card, without burdening all purchasers with the cost of expensive hardware to enable the subsequent upgrade.

29 Claims, 2 Drawing Sheets

"0" = I₂O SUBORDINATE
"1" = HOST CPU SUBORDINATE

METHOD AND APPARATUS FOR ENABLING A COMPUTER USER TO CONVERT A COMPUTER SYSTEM TO AN INTELLIGENT I/O SYSTEM

FIELD OF INVENTION

This invention relates generally to computer systems and particularly to intelligent I/O subsystems for computer systems.

BACKGROUND OF THE INVENTION

As computer systems handle ever more complex operations, it is becoming increasingly more desirable to accelerate or augment the ability of computer systems to quickly handle interrupts from I/O devices and to use I/O subsystems which remove some of the burden of I/O interrupt processing from the central processing unit. These functions can be achieved with so called intelligent I/O ("$I_2O$") subsystems which may be used, for example, in PC servers.

The aim of the intelligent I/O subsystem is to improve the speed at which users access and manipulate text, graphic, video and audio data, maximizing the performance of the computer system. In addition intelligent I/O subsystems may free the host central processing unit from handling many interrupt driven I/O processing tasks and allow the host CPU to address secondary PCI bus devices through a PCI-to-PCI bridge. Intelligent I/O may be implemented by so-called add-on adapter cards or accelerator cards that are computer subsystems with embedded processors, memory, and peripheral components.

Since the demand for network computing is increasing, the nature of the I/O processing demand, is likewise increasing. In addition, the size of the data being accessed and its type is increasingly containing natural data elements such as video, audio, text and graphics.

One implementation of intelligent I/O is the Intel i960 RP processor. This processor includes a PCI-to-PCI bridge with an internal processor and memory control. Although the i960 RP processor has many advantages, some users may feel that the cost is excessive in view of the potential performance obtainable from the device. In addition, because it is a hierarchical type of system, it adds system complexity compared to a peer system. Generally, a peer system does not require additional system bridges such that additional devices are added in a subsidiary relationship to existing structure.

In addition, the Intel i960 part is normally implemented by permanently connecting that part to the system motherboard. Thus, this capability becomes an added expense borne by all computer purchasers regardless of whether they want $I_2O$ capability.

Another approach to implementing intelligent I/O processing is disclosed in U.S. patent application, Ser. No. 08/658,634, filed Jun. 5, 1996 in the name of Whiteman, et al. entitled "Using Subordinate Bus Devices", which is hereby expressly incorporated by reference. This patent application discloses a system which allows an $I_2O$ processing card to be added through a pair of cable connected bridges. The $I_2O$ processor card may be inserted into an expansion bus and the system identifies the location of the card and the devices subsidiary thereto. A programmable device handles interrupt routing. The configuration cycle may be blocked for the subsidiary devices such that the central processing unit only recognizes the $I_2O$ processing card rather than the subsidiary devices. Thus, communications between the processor and subsidiary devices must pass through the bridges to the $I_2O$ processor card which, because of its internal computing capabilities, can enhance the performance of the subsidiary devices which have no such capabilities. Although this system has many advantages, it uses an essentially hierarchial system with additional bridges to implement the system and added cost, even for those users that prefer not to implement $I_2O$ processing capabilities.

Still another approach to implementing $I_2O$ processing involves a system with a primary host bridge and a secondary host bridge. An Intel i960 chip may be added to a slot in the primary host bridge and a slot in a connector connected to the secondary host bridge. The secondary host bridge may then be disabled so that all communications to or from the bus connected to the secondary bridge are re-routed through the primary host bridge. This system may introduce delays since it, in effect, deactivates an existing system bridge and requires communications originating from either of two buses to proceed through the single active bridge. Thus to some degree it may create the same kind of problems it aims to solve. Moreover, it necessarily requires all purchasers to bear a significant portion of the expense involved in achieving an $I_2O$ capability that some users may not desire.

While the existing systems have many performance advantages and features, it would be highly desirable to provide a system for enabling the user to implement $I_2O$ processing capabilities when and if desired but in a way which does not detract from the architecture of his or her existing computer system. In addition, it would be very advantageous to provide a way to make the system upgradeable to an $I_2O$ system without imposing significant expense for the $I_2O$ capability on all system purchasers.

SUMMARY OF THE INVENTION

In accordance with one aspect of the present invention, a computer system capable of implementing an intelligent input/output subsystem includes at least one processor and a bus bridge connected to the processor. An input/output bus is connected to the bridge. The bus has a plurality of slots for communicating with input/output devices. A connector is adapted to be connected to an intelligent input/output card. The connector is connected to receive the interrupt signals from input/output devices connected to the input/output bus. A circuit is connected to the connector for disabling the configuration cycle signals for at least some of the input/output devices whose interrupt signals have been connected to the connector, when the card is connected to the connector.

In accordance with another aspect of the present invention, a computer system including an intelligent input/output subsystem includes at least one host processor and a bus bridge connected to the host processor. An input/output bus is connected to the bridge, the bus having a plurality of slots for communicating with input/output devices. An intelligent input/output card is provided for processing interrupt requests from at least some of the input/output devices. A connector is connected to the intelligent input/output card, the connector also being connected to receive interrupt signals from the input/output devices connected to the input/output bus. A circuit is connected to the connector for disabling the configuration cycle signals for at least some of the input/output devices whose interrupt requests are processed by the card.

In accordance with still another aspect of the present invention, a method for facilitating intelligent input/output processing includes the step of providing a first bus slot and a connector in a computer system. Interrupt signals from a plurality of input/output devices connected to the first bus are caused to be passed directly to the connector. The configuration cycle signals for devices in the first bus are controlled. In this way the connector may be situated to control certain devices inserted into slots on the first bus.

DETAILED DESCRIPTION OF THE PREFERRED EMBODIMENT

Figure 1:
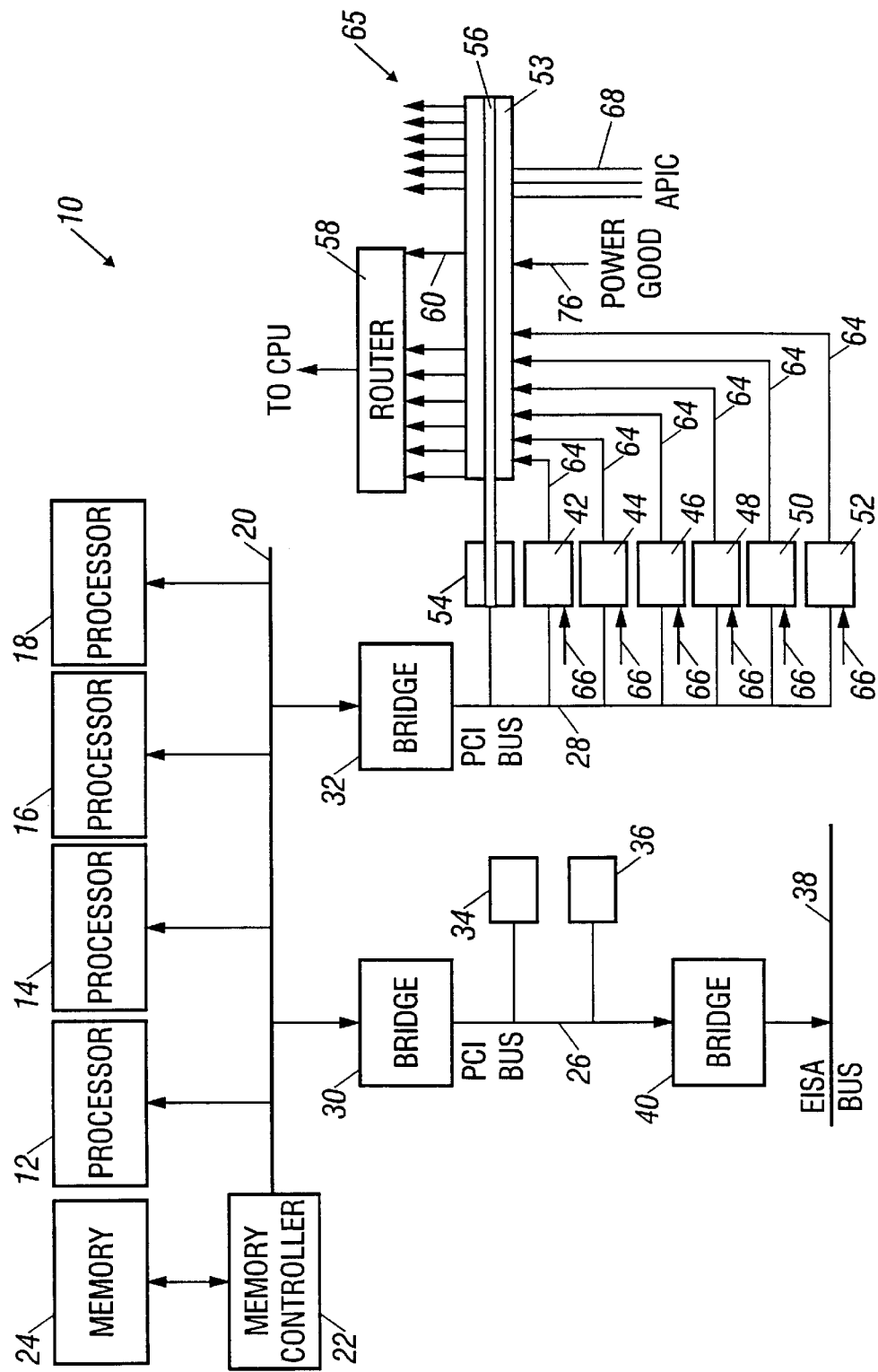
FIG. 1 is a schematic depiction of one embodiment of the present invention.

Referring to the drawing wherein like reference characters are used for like parts throughout the several views, a computer system 10 includes processors 12, 14, 16, and 18. The processors 12 through 18 may be implemented by an appropriate commercially available microprocessor. Each of the processors 12 through 18 connects to a host bus 20. The host bus also connects to a conventional memory controller 22, connected to a memory 24, which may be conventionally implemented by a dynamic random access memory.

The host bus may connect to a pair of Peripheral Component Interconnect or PCI buses 26 and 28 by way of the bridges 30 and 32. The host-to-PCI bridges 30 and 32 may be implemented in a conventional way. The bridge 30 may be a complementary or primary bridge and the bridge 32 may be a secondary bridge.

A number of PCI slots 34 and 36 may be connected to the PCI bus 26. The bus 26 may in turn connect to another bus such as an Extended Industry Standard Architecture or EISA bus 38 via the PCI-to-EISA bridge 40.

The PCI bus 28 may connect to a plurality of input/output devices. For example, the card slots 42, 44, 46 and 48 may connect to conventional I/O devices such as disk controllers, Small Computer System Interface or SCSI cards and network interface controller cards. The slots 50 and 52 may, for example, be filled by SCSI cards which operate in a conventional fashion. For example, a dual embedded SCSI controller may be implemented using slots 50 and 52.

An $I_2O$ or intelligent input/output connector 53 may be provided on the system motherboard for receiving an $I_2O$ card 56, for example through a ribbon connection (not shown). The connector 53 may be a stand-alone connector. A "stand-alone" connector, as used herein, refers to a multi-pin connector without any substantial integral electronic devices such that only a modest cost is borne by all system purchasers, whether or not they desire intelligent input/output capability.

Figure 3:
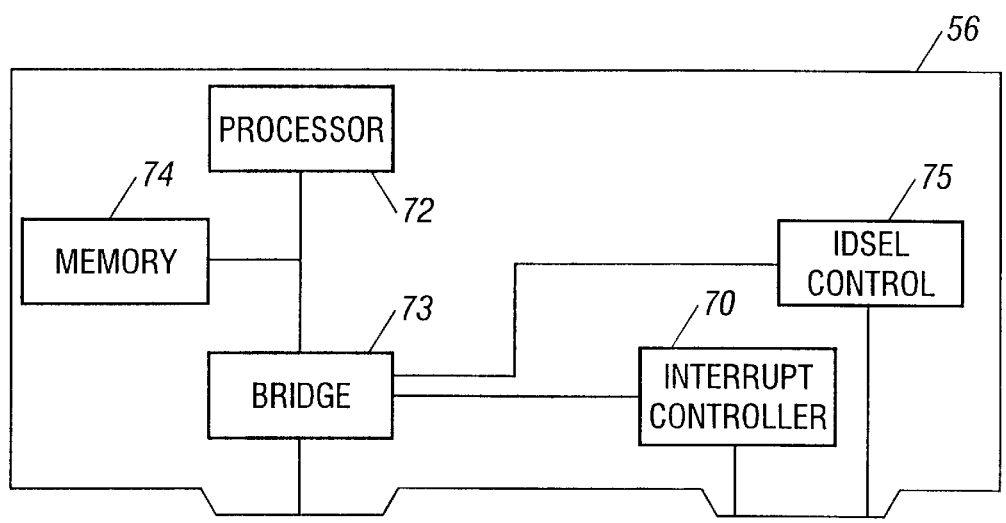
FIG. 3 is an enlarged, schematic depiction of an $I_2O$ processor card.

An $I_2O$ card 56, sometimes called an accelerator card, is a card which may include an interrupt controller 70, a microprocessor 72, a bridge 73, a memory 74, and IDSEL control device 75 as shown in FIG. 3. The card 56 is capable of locally processing interrupt signals without the need to burden the processors 12 through 18 with every interrupt request. The $I_2O$ card 56 may also fill the slot 54 on the PCI bus 28. While the card 56 is shown in the slot 54, it could be placed in any slot 42 to 52. When the card is plugged into the slot 54, the bridge 73 may be connected to the slot 54 while the interrupt controller 70 and IDSEL control device 75 may be connected to the connector 53.

In the embodiment illustrated in FIG. 1, the $I_2O$ card 56 can control any of the slots 42 to 52 and the devices contained therein. When devices without on-board processing capabilities are placed into the slots 42 to 52, they can have their performance enhanced through the operation of the $I_2O$ card 56 in a fashion explained hereinafter. However, the devices placed into certain slots 42 to 52 may have accelerated capabilities and may not need or may not be compatible with the enhancements possible with the $I_2O$ card 56.

A conventional router or interrupt controller 58 receives interrupt requests on the interrupt request lines 64 from the slots 42 to 52 when the card 56 is not present. When the card 56 is not present, the interrupts may be passed by the router 58 on to the appropriate interrupt controller (not shown). When the card 56 is present, as sensed and indicated on the card present pin 60, the card 56 may process all or some of interrupt requests it receives from any subordinate devices, such as devices in the slots 42 to 48. The remaining interrupts, such as those from cards placed in slots 50 and 52 in an illustrative embodiment, may be passed on by the router 58 to the appropriate interrupt controller, such as an advanced programmable interrupt controller (APIC) or an EISA interrupt controller as appropriate.

The router 58 receives system interrupt requests on lines 64 from I/O devices in the slots 42 to 52. System configuration software may choose how to distribute the interrupt requests issued by the various I/O devices between the interrupt controller 70 and the router 58. The router 58 and controller 70 may be software programmable so that they may assign a separate interrupt vector for any of the PCI interrupt request lines 64. Some interrupt requests may be routed by the router 58 or controller 70 to an embedded local module in a processor 12 to 18.

Conventionally, the system start-up configuration software programs the router 58 to distribute PCI interrupt requests from I/O devices that are not controlled by the card 56 and the controller 70 is programmed to handle the other interrupt requests. Generally, the operating system provides interrupt service routines for each recognized interrupt driven device in the system. On power good, an interrupt table is built prior to enabling the interrupt driven devices. Embedded devices may already have their interrupt chains programmed in the BIOS ROM. Other devices, discovered during the start up or auto-configuration process, usually must be configured.

The card 56 may include a device ROM with the desired interrupt information. Also, during the configuration process, the router 58 may be programmed to route interrupts developed by the subordinate devices (and certain interrupt requests from the card 56 itself) in an appropriate fashion.

In this way, interrupts from the subordinate devices may be processed in an expedited fashion by the card 56 without burdening the processors 12 through 18. Because of the enhanced capabilities possible with the IO card 56, it is possible to augment the operation of the subordinate devices 42 through 48.

To enable this operation it is desirable to block the configuration cycle from identifying the subordinate devices to be controlled by the card 56. If the configuration cycle identifies these devices, then the $I_2O$ processor 72 can not intervene to control communications between the central processing units 12 through 18 and these devices. Therefore, the identification cycles for any of the slots 42 through 52 that will be controlled by the card 56 may be blocked using the circuitry shown in FIG. 2.

Figure 4:
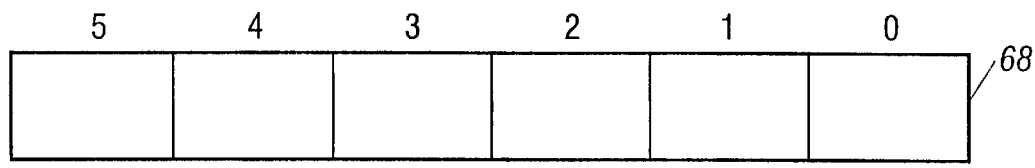
FIG. 4 is a depiction of an $I_2O$ processor card register.

The I$_2$O card 56 scans the bus 28 to identify I$_2$O subordinate devices. The I$_2$O card 56 runs configuration cycles to read the device identification word (device ID) of each bus device in a slot 42 through 52. The device identification word is located in the configuration header space of all PCI devices. The card 56 stores the results of this scan in a six bit register 68, shown in FIG. 4, in the memory 74, each bit 0 to 5 being associated with a slot 42 to 52, respectively. A high value for a bit indicates that the associated slot 42 to 52 has a bus device not controlled by the I$_2$O card 56 and a low value indicates the associated slot 42 to 52 has an I/O device subordinate to the I$_2$O card 56. The I$_2$O card 56 is then responsible to control the devices subordinate to it.

The card 56 decides, based on the device ID of the devices in the slots 42 to 52, whether to assume control of the devices in the slots 42 to 52. For example, the card 56 may have a series of device IDs stored in memory which correspond to devices which may be effectively controlled by the card 56. The card 56 may treat as subordinate those devices whose device IDs appear on the stored list of device IDs in the memory 74 of the card 56.

Figure 2:
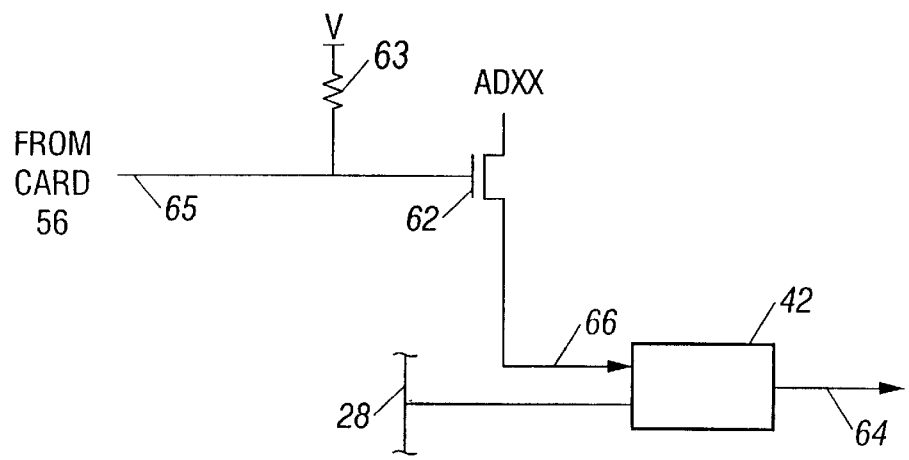
FIG. 2 shows one of the six identical configuration cycle blocking circuits, the illustrated circuit being the one for a device in the slot 42.

Any address signal ("ADXX") directed to any of the slots 42 through 52 is passed to one of six identically arranged switching transistors 62, one of which is shown in FIG. 2. These address signals, indicated as ADXX, are received on one terminal of a transistor 62 while the other terminal of the transistor 62 is connected to the ID select ("IDSEL") input 66 for each slot 42 through 52. A pull-up resistor 63 is connected to a voltage source. Alternatively, quick switches could be used in place of the transistors 62.

Each field effect transistor 62 selectively permits or blocks the connection of the identification select line (i.e., the address/data line ADXX) to the IDSEL pin 66 on any device inserted into a slot 42 to 52. The gate of each of the transistors 62 receives a corresponding bit from the card 56 through the pin 65. Thus, an ID select signal is only passed to a slot 42 to 52 when appropriate according to information contained in the card 56, when the card 56 is present. That is, if the card 56 determines that the device in a given slot 42 to 52 should be subordinate to the card, the card 56 blocks the configuration cycle for that device. For example, an ID select signal could be received by the slots 50 and 52, in the illustrated embodiment, but in the case of slots 42 to 48, the ID select signal could be blocked by the card 56.

Subordinate devices may have their configuration cycle signals blocked by the card 56 by taking the gate of the transistor 62 low, such that the address signals ADXX do not produce ID select signals to the appropriate pins 66 of the subordinate devices. The IDSEL control circuit 75, under control from the processor 72, pulls the gate of the transistor 62 low to block the configuration cycle to the subordinate devices.

When the card 56 is absent from the connector 53, the computer system 10 operates in a conventional fashion. Devices contained in any of the slots 42 through 52 are operated using the bridge 32 in a conventional way, through conventional interrupt processing. The gate of each transistor 62 is high and therefore all of the ID select signals are passed to the slots 42 to 52. The interrupt requests pass through the card 56 to the router 58 which handles routing of all the requests from devices 42 to 52.

When a card 56 is inserted into the connector 53 and the slot 54, the card present pin 60 provides a signal to the router 58 to indicate that control may be provided by the card 56. Interrupt lines 64 from devices in the various slots 42 to 52 pass to the card 56. Any of the interrupt signals for subordinate devices may be processed on the card 56 and other signals passed on to the router 58. The router 58 may then apply the appropriate routing to those signals depending on the type of interrupt signals involved. For example, APIC signals could be routed to an APIC and EISA signals are routed to an appropriate EISA controller.

The card 56 may also receive a "power good" signal on the pin 76 so that it can begin operation immediately on communication that appropriate power has been applied. This allows the card 56 to be ready for the configuration cycles which will follow so that it can implement appropriate control over the configuration cycles for any subordinate devices. The connector 53 also receives a plurality of APIC lines 78 for transmission of interrupt signals from interrupt controller 70 on the card 56 to an APIC (not shown).

As can be appreciated from FIG. 1, the present invention is capable of implementing a peer architecture wherein the subsidiary I/O devices may be controlled by the I$_2$O processor without altering the existing architecture or providing additional system bus-to-bus bridge structure. In addition, very little additional hardware is necessary to enable the user to upgrade his or her computer system 10 to utilize an intelligent I/O subsystem. Thus, the system 10 may be made intelligent I/O upgradeable without burdening all users with the cost of special hardware to enable intelligent I/O processing that some users may never use.

The present invention is also amenable to a substantial variation in implementation. For example, instead of using the router 58, a programmable device, such as a programmable logic device ("PLD") or, for example, a programmable array logic ("PAL") device, may be used for interrupt routing and masking. While the present invention is shown as being implemented by a card 56 which determines which interrupts to handle itself and which to pass on to the router 58, this function could be provided by a "smart" router with the appropriate processing capability to determine which interrupts should be handled by the I$_2$O card and which should be passed on to the conventional interrupt controllers. Alternatively, the operating system or BIOS software can be used to recognize the presence of the card 56 and to disable the appropriate interrupts for the subordinate cards.

While the present invention has been described with respect to a single preferred embodiment, those skilled in the art will appreciate a number of variations and modifications therefrom. It is intended within the appended claims to cover all such variations and modifications that fall within the true spirit and scope of the present invention.

What is claimed is:

1. A computer system comprising:
   at least one processor;
   a bus bridge coupled to said processor; an input/output bus coupled to said bridge, said bus having a plurality of slots for communicating with input/output devices that may receive configuration cycle signals;
   a connector adapted to be connected to an intelligent input/output card, said connector being connected to receive interrupt signals from input/output devices connected to said input/output bus;
   a circuit connected to said connector for disabling the configuration cycle signals for at least some of said input/output devices whose interrupt signals have been connected to said connector, when said card is connected to said connector; and said circuit includes a plurality of transistors connected to receive address signals on one terminal, the gate of each transistor being connected to said connector such that signals from said connector can control the conduction of said transistor and thereby determine whether one of said devices in one of said slots receives a configuration cycle signal.

2. The computer system of claim 1 including a first device for detecting the connection of the said intelligent input/output card to said connector.

3. The computer system of claim 1 wherein a programmable router is connected to said connector, said router being programmable to at least route those interrupt signals that would not be processed by a card located in said connector.

4. The computer system of claim 1 where the system is configured so that the interrupt signals from the at least some of the input/output devices can be coupled to the card when the card is connected to the connector.

5. The computer system of claim 1 and further comprising an input/output device coupled in one of the plurality of slots.

6. The computer system of claim 1 and further comprising said intelligent input/output card connected to the connector.

7. A computer system comprising:
   at least one processor;
   a bus bridge coupled to said processor; an input/output bus coupled to said bridge, said bus having a plurality of slots for communicating with input/output devices that may receive configuration cycle signals;
   a connector adapted to be connected to an intelligent input/output card, said connector being connected to receive interrupt signals from input/output devices connected to said input/output bus; and
   a circuit connected to said connector for disabling the configuration cycle signals for at least some of said input/output devices whose interrupt signals have been connected to said connector, when said card is connected to said connector;
   wherein said slots are scannable by a card connected to said connector such that said card can determine the device identification for each of the devices connected to said slots.

8. The computer system of claim 1 wherein said system has a peer architecture that enables an intelligent input/output card to be added subsequently to the system.

9. A computer system comprising:
   at least one processor;
   a bus bridge coupled to said processor; an input/output bus coupled to said bridge, said bus having a plurality of slots for communicating with input/output devices that may receive configuration cycle signals;
   a connector adapted to be connected to an intelligent input/output card, said connector being connected to receive interrupt signals from input/output devices connected to said input/output bus; and
   a circuit connected to said connector for disabling the configuration cycle signals for at least some of said input/output devices whose interrupt signals have been connected to said connector, when said card is connected to said connector;
   wherein said system is arranged such that a card in said connector can control one or more of said slots and one or more of said slots.

10. The computer system of claim 1 wherein said connector is a stand-alone connector.

11. The computer of claim 9 wherein said system is arranged such that one or more of set slots can be controlled by other means.

12. A computer system comprising:
   at least one processor;
   a bus bridge coupled to said processor; an input/output bus coupled to said bridge, said bus having a plurality of slots for communicating with input/output devices that may receive configuration cycle signals;
   a connector connected to receive interrupt signals from input/output devices connected to said input/output bus, an intelligent input/output card inserted into said connectors, said card operable to determine the device identification of any device in any of said slots such that said card can determine whether it is desirable for said card to block the configuration cycle for said device; and
   a circuit connected to said connector for disabling the configuration cycle signals for at least some of said input/output devices whose interrupt signals have been connected to said connector.

13. A computer system comprising:
   at least one processor;
   a bus bridge coupled to said processor; an input/output bus coupled to said bridge, said bus having a plurality of slots for communicating with input/output devices that may receive configuration cycle signals;
   a connector adapted to be connected to an intelligent input/output card, said connector being connected to receive interrupt signals from input/output devices connected to said input/output bus; and
   a circuit connected to said connector for disabling the configuration cycle signals for at least some of said input/output devices whose interrupt signals have been connected to said connector, when said card is connected to said connector;
   wherein said connector is connectable to an intelligent input/output said card such that said card is capable of running a configuration cycle for said input/output devices prior to the system configuration cycle.

14. The computer system of claim 13 wherein said connector is connected to a signal which indicates when appropriate power has been established.

15. A computer system comprising:
   at least one processor;
   a bus bridge coupled to said processor; an input/output bus coupled to said bridge, said bus having a plurality of slots for communicating with input/output devices that may receive configuration cycle signals;
   a connector connected to receive interrupt signals from input/output devices connected to said input/output bus, an intelligent input/output card inserted into said connector, said card including an intelligent input/output processor and an intelligent input/output memory connected to one another, and a bridge connected to said intelligent input/output processor to facilitate communications between said card and the remainder of said system; and
   wherein said card includes a configuration cycle blocking circuit connected to said connector for disabling the configuration cycle signals for at least some of said input/output devices whose interrupt signals have been connected to said connector.

16. The computer system of claim 15 including an interrupt controller on said card, connected to said bridge and to said connector.

17. A computer system comprising:

at least one processor;

a bus bridge coupled to said processor; an input/output bus coupled to said bridge, said bus having a plurality of slots for communicating with input/output devices that may receive configuration cycle signals;

a connector connected to receive interrupt signals from input/output devices connected to said input/output bus, an intelligent input/output card inserted into said connector, said card including an intelligent input/output processor and an intelligent input/output memory connected to one another, and a bridge connected to said intelligent input/output processor to facilitate communications between said card and the remainder of said system;

a circuit connected to said connector for disabling the configuration cycle signals for at least some of said input/output devices whose interrupt signals have been connected to said connector;

wherein said intelligent input/output memory includes a register for storing an indication of which devices and which slots will have their configuration cycles disabled by said circuit and which devices will be controlled by said intelligent input/output processor.

18. A computer system capable of implementing an intelligent input/output subsystem comprising:

at least one host processor;

a bus bridge connected to said host processor;

an input/output bus connected to said bridge, said bus having a plurality of slots for communicating with input/output devices that may receive configuration cycle signals;

an intelligent input/output card for processing interrupt requests from at least some of said devices, said card including an intelligent input/output processor and a bridge connected to one another, said bridge being connected to one of said slots;

a connector connected to said intelligent input/output card, said connector also being connected to receive interrupt signals from said input/output devices connected to said input/output bus;

a circuit connected to said connector for disabling the configuration cycle signals for at least some of said input/output devices whose interrupt requests are processed by said card; and said card is connected to receive a signal indicative that power has been established such that said intelligent input/output processor may be prepared to configure devices contained in said slots prior to the time that said host processor configures the devices in said slots.

19. The computer system of claim 18 wherein said card may be programmed to process some interrupt requests from devices contained in said slots and to allow other interrupt requests to pass for interrupt processing by other devices.

20. The computer system of claim 18 and further comprising an input/output device coupled in one of the plurality of slots.

21. The computer system of claim 18 wherein said intelligent input/output processor scans the slots on said bus to determine which devices would be appropriate to have their interrupts processed by said card.

22. The computer system of claim 21 wherein said card includes a storage medium, said storage medium storing the device identifications for input/output devices which may advantageously be controlled by said card.

23. The computer system of claim 18 wherein said card includes an intelligent input/output device connected to said intelligent input/output processor for controlling the configuration cycles for certain of said input/output devices, said intelligent input/output device being connected to said circuit through said connector.

24. The computer system of claim 18 wherein said card includes an interrupt controller connected to said connector and to said intelligent input/output processor.

25. A method for implementing a computer system facilitating intelligent input/output processing, the method comprising:

providing a computer system with a first bus having slots and a connector;

scanning a plurality of said slots connected to said first bus to determine which of said slots should be controlled by said card;

causing interrupt signals from a plurality of input/output devices connected to said slots in said first bus to be passed directly to said connector; and controlling the configuration cycle signals for said devices on said first bus.

26. A method for implementing a computer system facilitating intelligent input/output processing, the method comprising:

providing a computer system with a first bus having slots and a connector;

recording information indicative of which of said slots should be controlled by said card;

causing interrupt signals from a plurality of input/output devices connected to said slots in said first bus to be passed directly to said connector; and controlling the configuration cycle signals for said devices on said first bus.

27. The method of claim 26 including the step of programming a system interrupt processor not located on said card such that said interrupt processor only processes signals from certain of said slots connected to said first bus.

28. The method of claim 26 including the step of permitting said card to process some of the interrupt signals from devices connected to said first bus.

29. The method of claim 26 wherein the step of controlling the configuration cycle signals includes the step of blocking the configuration cycle signals to certain of said input/output devices after said card has been inserted into one of said slots.

* * * * *